June 4, 1935.  W. A. REICHEL  2,003,759
LIQUID LEVEL INDICATOR
Filed Dec. 5, 1931
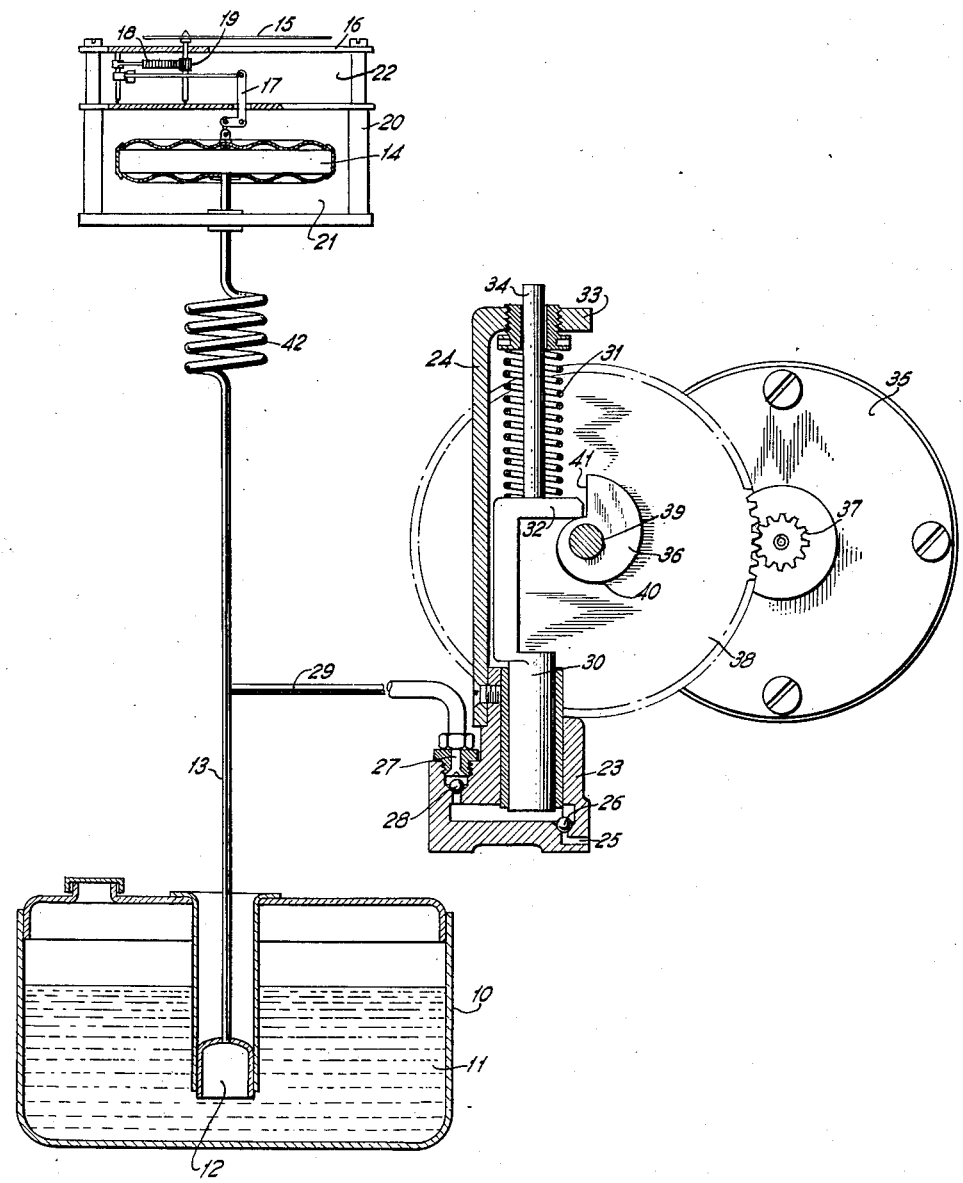
INVENTOR
WladimirA. Reichel.
BY
Stephen Cerstvik
ATTORNEY Patented June 4, 1935

2,003,759

UNITED STATES PATENT OFFICE 2,003,759

LIQUID LEVEL INDICATOR

Wladimir A. Reichel, Philadelphia, Pa., assignor to Bendix Aviation Corporation, South Bend, Ind., a corporation of Delaware Application December 5, 1931, Serial No. 579,283

18 Claims. (Cl. 73—54)

The present invention relates to indicating devices, and more particularly refers to devices for indicating liquid levels by hydrostatic pressures.

One of the objects of the invention is to provide in a hydrostatic liquid level indicator, novel means whereby the quantity of a contained liquid may be accurately measured and indicated at all times without necessitating manual operation.

Another object of the invention is to provide in a liquid level indicator of the hydrostatic type embodying a closed fluid pressure system, novel means whereby the fluid pressure is maintained automatically so that continuous accurate indications are obtained.

Another object is to provide in a liquid level indicator of the class described embodying means for replenishing the fluid pressure in the system, novel means for periodically operating said replenishing means without manual operations.

A further object is to provide in a liquid level system embodying a hydrostatic cell and a closed pressure system between the cell and the indicator and a pump for replenishing the fluid pressure in the system, novel means for automatically operating the pump at predetermined intervals whereby accurate indications are obtained at all times.

The above and other objects and advantages of the invention will appear more fully hereinafter from a consideration of the detailed description which follows, taken together with the accompanying drawing, wherein is illustrated one embodiment of the invention. It is to be expressly understood, however, that the drawing is for the purpose of illustration and description only, and is not designed as a definition of the limits of the invention, reference being had for this purpose to the appended claims.

The single figure of the drawing is a partially diagrammatic view, partly in section, of one form of the novel means embodying the present invention.

The novel means embodying the present invention are particularly suitable for use in liquid level indicating devices of the hydrostatic type illustrated and described in Patents Nos. 1,711,506 and 1,711,507 issued to Morris M. Titterington, wherein an entrapped column of air or gas is used to transmit pressures from the liquid whose level is to be indicated, to a pressure responsive actuator operating an indicating device, the pressure being a function of the liquid level or hydrostatic head.

As shown by the patents referred to, a liquid level gauge or indicator of the type wherein a hydrostatic cell is immersed in a liquid in a receptacle and connected to a pressure responsive indicator with entrapped air serving to transmit pressures equivalent to the head of the liquid above the hydrostatic cell is well-known. The patentee has also recognized the fact that the entrapped air may leak or be absorbed, with the result that the air pressure in the system ceases to be a measure of liquid level, hydrostatic head, or volume, and has proposed to use a hand pump for replenishing the air to restore the pressure in the system; but such a manually operated device, although suitable in aircraft or other vehicle installations since the pilot or operator can readily operate the hand pump whenever he desires to obtain an indication of liquid level, is not suitable in installations such as employed in liquid fuel heating systems for buildings, where it is desired to obtain an indication of the fuel level by merely noting an indicator without having to perform any manual operations.

Then again, in connection with automobile gasoline tank gauges, it has been proposed to use engine suction, horn-operation, or car vibration, to operate the air replenishing means. In accordance with the present invention, such unreliable and irregularly operating devices are dispensed with and an air-injecting means is provided which is periodically operated in a continuous manner to replenish the air supply. The present novel arrangement is susceptible of a wide variety of applications for which some of the prior art would be unsuited, since it is not dependent upon external conditions such as vibration, engine operation, or horn-blowing for air-replenishment. For example, the novel apparatus may be used, as pointed out above, to determine the liquid level or volume of a fuel supply tank in liquid fuel heating systems of buildings, or of a stationary tank on board ships.

The improved air replenishing means of the invention comprises an air pump including a cylinder having a piston therein which is moved on its working stroke by a spring, and a cam for retracting the piston against the force of the spring, said cam being rotated through suitable gearing by a relatively small continuously operating synchronous electric motor such as is used to operate electric clocks and which consumes very little current, although any suitable continuously operating motor may be used, such as a spring motor adapted to be continually wound by direct-current means.

Therefore, a more specific object of the present invention is to provide an air-injecting pump operated through suitable gearing by a small electric motor, whereby air injections will recur continually at regular intervals.

Referring to the drawing, there is shown a container or tank 10 containing the liquid 11, the level of which is to be indicated. The indicating apparatus includes a closed pressure system comprising a hydrostatic cell 12 immersed in the liquid and connected by means of a pipe or conduit 13 to a pressure responsive element or actuator such as a closed diaphragm box 14. The pressure responsive diaphragm is arranged to actuate a pointer 15 over a suitable dial or scale 16 through the linkage 17 and gear and pinion 18 and 19, respectively. The entire pressure responsive mechanism may be enclosed in a suitable casing (not shown) supported by spacing rods 20 and which may comprise a single chamber, or a separate chamber 21 for the pressure responsive diaphragm and chamber 22 for the transmission mechanism.

In operation, the head of liquid 11 compresses air which is entrapped in the hydrostatic cell 12, conduit 13, and pressure responsive diaphragm 14, said air pressure being in equilibrium with the hydraulic head and serving as a measure of liquid level or volume in the tank 10. The hydrostatic cell 12 minimizes the error due to air compression and the rising of liquid therein with increasing head. If air should escape from the system, as it is likely to do if not replenished frequently, liquid would rise in the hydrostatic cell, with the result that the indications would be erroneous, and therefore the novel means embodying the present invention are provided for overcoming such difficulty. In the form shown, said means comprise a cylinder 23 carried by a suitable bracket 24 and having a suction inlet or intake port 25 with a ball-check valve 26 and a discharge passage or exhaust port 27 also provided with a ball-check valve 28, the discharge passage 27 being connected to the pipe or conduit 13 by means of a branch pipe 29. Within the cylinder 23 there is provided a piston 30 which is arranged to be moved on its compression or working stroke by means of a suitable spring 31 interposed between a retracting or back-stroke abutment 33 secured to or formed integral with the bracket 24, said abutment 33 also serving as a guide for the piston rod 34.

Means are now provided for continually actuating the piston 30 at predetermined intervals and, in the form shown, comprise a small electric motor 35 which, as pointed out above, is preferably of the synchronous type used to operate electric clocks. The rotor (not shown) of the electric motor 35 is drivably connected to a cam member 36 through suitable gearing such as the pinion 37 carried by the rotor and gear 38 carried on a countershaft 39 which also carries the cam 36. The cam 36 cooperates with the abutment 32 to retract the piston 30 against the spring 31 and then to suddenly release said piston whereupon the spring imparts a quick working stroke thereto. Preferably, the cam 36 is so formed that it has a cam surface 40, the radius of which increases with respect to the axis of shaft 39, and the ends of the cam surface are separated by an abrupt radial surface 41.

It will be seen that as the electric motor 35 drives the pinion 37 the latter in turn will drive the gear 38, thereby rotating the cam 36 on its shaft 39 and gradually retracting the piston 30 against the spring 31 until the radial surface 41 is reached, during which time air is sucked into the cylinder through the intake port 25, and upon the cam reaching the position indicated in the drawing, the spring 31 then imparts a rapid working stroke to the piston, thereby pumping the air through the exhaust port 27 into the pipe 13 through the pipe 29. The gearing 37 and 38 has been shown as of the reduction type, although it may be of any desired ratio so as to give any number of revolutions per minute of the pinion 37 and hence strokes per minute to the piston, as for example, two or three per minute in the present instance, or one in two minutes, depending upon the number of strokes that are necessary to maintain the air supply in the pressure system and to provide a mechanical advantage for the electric motor in order that the power consumption of the latter may be small, or practically negligible.

Means are also provided whereby pulsations in the pressure responsive member 14 due to air injections are dampened and the effect thereof on the pointer 15 minimized. In the form shown, said means comprise a coil section 42 interposed in the pipe line 13 between the point at which the air supply is introduced through the pipe 29, and the pressure responsive diaphragm 14. However, any other suitable damping means may be provided.

There is thus provided a novel liquid level indicator which is relatively simple and yet accurate and dependable in operation, since the pressure system embodied therein is always replenished with suitable fluid so that the hydraulic head of the liquid is accurately transmitted to the indicator.

While only one embodiment of the invention has been illustrated and described, other changes and modifications and arrangement of parts, which will now appear to those skilled in the art, may be made without departing from the scope of the invention. Reference is to be had to the appended claims for a definition of the limits of the invention.

What is claimed is:

1. In apparatus for indicating the quantity or level of a liquid, comprising a receptacle containing the liquid to be measured, an indicator including a pressure responsive actuator therefor; a closed pressure system including a hydrostatic cell immersed in the liquid to the maximum depth to be indicated and connected to the pressure responsive actuator, whereby fluid pressure entrapped in the system is effective for producing an indication of the level of the liquid; and means for replenishing the fluid pressure in said closed pressure system; the combination with said pressure replenishing means, of time-controlled means for operating the latter at predetermined timed intervals so that continuous accurate indications of the quantity of liquid in the receptacle are obtained.

2. In apparatus for indicating the quantity or level of a liquid, comprising a receptacle containing the liquid to be measured, an indicator including a pressure responsive actuator therefor; a closed pressure system including a hydrostatic cell immersed in the liquid to the maximum depth to be indicated and connected to the pressure responsive actuator, whereby fluid pressure entrapped in the system is effective for producing an indication of the level of the liquid; and means comprising a pump for supplying fluid pressure to said closed pressure system; the combination with said pump, of time-controlled means for operating said pump at timed intervals to maintain the pressure in the closed pressure system at all times so that continuous accurate indications of the quantity of liquid in the receptacle are obtained.

3. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of time-controlled means for maintaining the pressure in said system at all times so that continuous accurate indications of the quantity of liquid in the receptacle are obtained.

4. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of means for maintaining the pressure in said system at all times so that continuous accurate indications of the quantity of liquid in the receptacle are obtained; said last mentioned means comprising a pump and time-controlled driving means for continually operating said pump at predetermined timed intervals.

5. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of means for maintaining the pressure in said system at all times so that continuous accurate indications of the quantity of liquid in the receptacle are obtained; said last mentioned means comprising a spring actuated pump and time-controlled driving means for continually actuating said pump against the spring pressure thereof at predetermined timed intervals.

6. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of means for maintaining the pressure in said system at all times so that continuous accurate indications of the quantity of liquid in the receptacle are obtained; said last mentioned means comprising a pump and a continuously operating time-controlled driving means for continually operating the pump at predetermined timed intervals.

7. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of means for maintaining the pressure in said system at all times so that continuous accurate indications of the quantity of liquid in the receptacle are obtained; said last mentioned means comprising a pump, a synchronous electric motor, and means between the pump and motor and actuated by the latter for continually operating the pump at predetermined timed intervals.

8. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of means for maintaining the pressure in said system at all times so that continuous accurate indications of the quantity of liquid in the receptacle are obtained; said last mentioned means comprising a pump, a continuously operating synchronous electric clock motor, and means between the pump and motor and actuated by the latter for continually operating the pump at predetermined timed intervals.

9. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of means for maintaining the pressure in said system at all times so that continuous accurate indications of the quantity of liquid in the receptacle are obtained; said last mentioned means comprising a spring actuated pump, a continuously operating constant-speed synchronous electric motor, and means driven by the motor for periodically compressing and releasing the spring of the pump to actuate the latter at timed intervals.

10. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of means for maintaining the pressure in said system at all times so that continuous accurate indications of the quantity of liquid in the receptacle are obtained; said last mentioned means comprising a pump, a cam for actuating the pump, and a continuously operating constant-speed synchronous electric motor for driving the cam so that the pump is operated continually at predetermined timed intervals.

11. In apparatus for indicating the quantity or level of a liquid, comprising a receptacle containing the liquid to be measured, an indicator including a pressure responsive actuator therefor; and a closed pressure system including a hydrostatic cell immersed in the liquid to the maximum depth to be indicated and connected to the pressure responsive actuator, whereby fluid pressure entrapped in the system is effective for producing an indication of the level of the liquid; the combination with said closed pressure system, of time-controlled means for maintaining the pressure in said system at all times so that continuous accurate indications of the quantity of liquid in the receptacle are obtained; and damping means arranged in the pressure system between the pressure responsive actuator and said time-controlled means to minimize the effect of pulsations on the indicator due to the operation of said time-controlled means.

12. Apparatus for indicating the quantity or level of a liquid, comprising a receptacle containing the liquid to be measured, an indicator including a pressure responsive actuator therefor; a hydrostatic cell immersed in said liquid to the maximum depth to be indicated and connected to the pressure responsive actuator, whereby the pressure of air entrapped in the hydrostatic cell is effective to operate the actuator for producing an indication of the level of said liquid; and time-controlled means for periodically supplying air to said hydrostatic cell and actuator at timed intervals including a cylinder having an inlet passage and a discharge passage, the latter being connected between the hydrostatic cell and the pressure responsive actuator; a piston in said cylinder; a spring for moving the piston on its working stroke; a cam effective throughout the major portion of each of its movement cycles to retract the piston and then to release the latter suddenly; reduction gearing including a driving pinion and a driven gear, the driven gear being operatively connected to the cam; and a continuously operating constant-speed motor driving the pinion at a predetermined low number of revolutions per minute.

13. Apparatus for indicating the quantity or level of a liquid, comprising a receptacle containing the liquid to be measured, an indicator including a pressure responsive actuator therefor; a hydrostatic cell immersed in said liquid to the maximum depth to be indicated and connected to the pressure responsive actuator, whereby the pressure of air entrapped in the hydrostatic cell is effective to operate the actuator for producing an indication of the level of said liquid; time-controlled means for periodically supplying air to said hydrostatic cell and actuator including a cylinder having an inlet passage and a discharge passage, the latter being connected between the hydrostatic cell and the pressure responsive actuator; a piston in said cylinder; a spring for moving the piston on its working stroke; a cam effective throughout the major portion of each of its movement cycles to retract the piston and then to release the latter suddenly; reduction gearing including a driving pinion and a driven gear, the driven gear being operatively connected to the cam; a continuously operating constant-speed motor driving the pinion at a predetermined low number of revolutions per minute; and damping means between the pressure responsive actuator and the point of connection of the discharge passage of the cylinder to minimize the effect of pulsations on the indicator produced by the operation of the piston.

14. Apparatus for indicating the quantity or level of a liquid, comprising a receptacle containing the liquid to be measured, an indicator including a pressure responsive actuator therefor; a hydrostatic cell immersed in said liquid to the maximum depth to be indicated and connected to the pressure responsive actuator, whereby the pressure of air entrapped in the hydrostatic cell is effective to operate the actuator for producing an indication of the level of said liquid; time-controlled means for periodically supplying air to said hydrostatic cell and actuator including a cylinder having an inlet passage and a discharge passage, the latter being connected between the hydrostatic cell and the pressure responsive actuator; a piston in said cylinder; a spring for moving the piston on its working stroke; a cam effective throughout the major portion of each of its movement cycles to retract the piston and then to release the latter suddenly; reduction gearing including a driving pinion and a driven gear, the driven gear being operatively connected to the cam; a continuously operating electric motor of constant speed driving the pinion at a low rate such that the gear and cam rotate at less than five revolutions per minute; and damping means between the pressure responsive actuator and the point of connection of the discharge passage of the cylinder to minimize the effect of pulsations on the indicator produced by the operation of the piston.

15. In a device for replenishing the pressure in a closed pressure system of a hydrostatic liquid-level indicator, the combination of a pump comprising a cylinder having an inlet passage and a discharge passage, the latter being adapted to be connected to the closed pressure system, a piston in said cylinder, a spring which is compressed by the piston upon movement of the latter in one direction, a cam for operating the piston to compress the spring and to release said piston at the end of its movement in one direction whereby the spring is effective to move the piston in the opposite direction, and continuously operating constant-speed means for rotating the cam to continually operate the piston at predetermined timed intervals.

16. In a device for replenishing the pressure in a closed pressure system of a hydrostatic liquid-level indicator, the combination of a pump comprising a cylinder having an inlet passage communicating with the atmosphere and a discharge passage adapted to be connected to the closed pressure system, a piston in said cylinder, a spring which is compressed by the piston upon movement of the latter in one direction, a cam for operating the piston to compress the spring and to release said piston at the end of its movement in one direction whereby the spring is effective to move the piston in the opposite direction, means for closing the discharge passage while the inlet passage is open, means for closing the inlet passage while the discharge passage is open, and time controlled means for rotating the cam to operate the piston at predetermined timed intervals.

17. In a device for replenishing the pressure in a closed pressure system of a hydrostatic liquid-level indicator, the combination of a pump comprising a cylinder having an inlet passage and a discharge passage, the latter being adapted to be connected to the closed pressure system, a piston in said cylinder, a spring which is compressed by the piston upon movement of the latter in one direction, a cam for operating the piston to compress the spring and to release said piston at the end of its movement in one direction whereby the spring is effective to move the piston in the opposite direction, and a continuously operating constant speed motor for rotating the cam at a predetermined number of revolutions per minute to operate the piston at predetermined timed intervals.

18. In a device for replenishing the pressure in a closed pressure system of a hydrostatic liquid-level indicator, the combination of a pump comprising a cylinder having an inlet passage and a discharge passage, the latter being adapted to be connected to the closed pressure system, a piston in said cylinder, a spring which is compressed by the piston upon movement of the latter in one direction, a cam for operating the piston to compress the spring and to release said piston at the end of its movement in one direction whereby the spring is effective to move the piston in the opposite direction, reduction gearing including a driving gear and a driven gear, the latter being operatively connected to the cam for rotating it, and a synchronous electric motor for operating the driving gear whereby the cam operates the piston at predetermined timed intervals.

WLADIMIR A. REICHEL.